Jan. 12, 1932.  E. E. RIES  1,840,742

PHONOSCOPIC AND PHONOPHOTOSCOPIC RECORD

Original Filed May 21, 1913

INVENTOR
Elias E. Ries

BY
ATTORNEY

Patented Jan. 12, 1932

1,840,742

UNITED STATES PATENT OFFICE

ELIAS E. RIES, OF NEW YORK, N. Y., ASSIGNOR, BY MESNE ASSIGNMENTS, TO GENERAL TALKING PICTURE CORPORATION, A CORPORATION OF DELAWARE

PHONOSCOPIC AND PHONOPHOTOSCOPIC RECORD

Original application filed May 21, 1913, Serial No. 769,114. Divided and this application filed April 23, 1923. Serial No. 633,908. Renewed June 3, 1931.

My present invention relates primarily to phonoscopic or talking picture films, although some of the broader features of the invention are concerned with talking films unaccompanied by pictures.

It is among the objects of the invention to provide a film of the above type which is relatively easy to produce with the use of simple apparatus, and from which the original visual and sonorous action can be realistically reproduced.

In one embodiment of the invention, the sound record constitutes a narrow band along one of the borders between the edge of the film and the picture frames. The band varies continuously in translucency along the length thereof, the translucency at any point corresponding to the momentary amplitude of air vibration accompanying the originating sonorous action. The sound record may be accurately synchronized with the pictures or may have a small lead or a small leg with respect thereto, depending on the manner in which the film is produced.

In one embodiment a film of substantially the standard width and proportions commonly used for ordinary kinematographic purposes carries the picture and the sound record, so that the ordinary kinematographic camera may be used as an element of the apparatus for producing the phonoscopic film and the ordinary kinematographic projection machine may be used as an element in the projection or reproducing apparatus.

Figure 3:
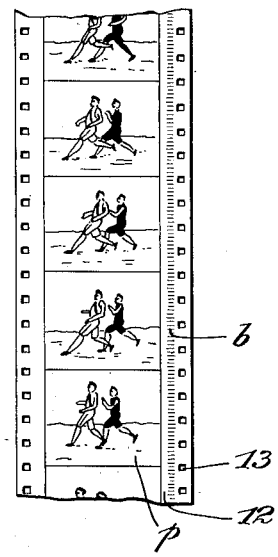
Figure 4:
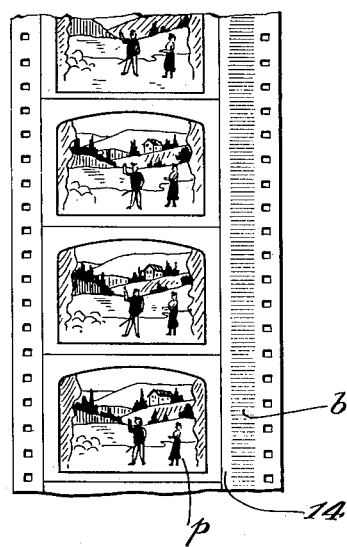
Figure 1:
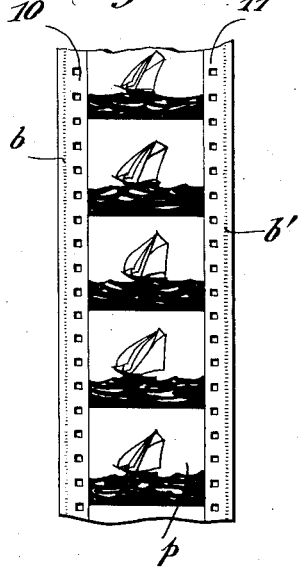
Figure 5:
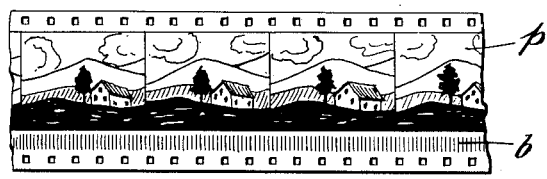
Figure 2:
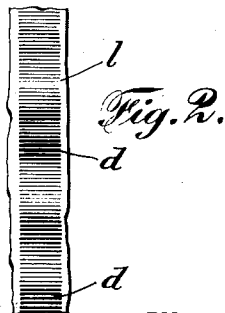

In the accompanying drawings, in which are shown a few of various possible embodiments of the several features of the invention, Fig. 1 is a fragmentary strip of one form of phonoscopic or talking picture films, Fig. 2 is a fragmentary view on a greatly enlarged scale of a small length of the sound record band, and Figs. 3, 4, and 5 are views similar to Fig. 1, of modifications.

In the embodiment of Fig. 1, I have shown a section of a film which may be of substantially the standard width for kinematic purpose, and has the successive views or pictures "$p$" of usual width between the lines of sprocket holes 10 and 11, which are shown at the usual distances from the lateral edges of the film. Upon the border of the film between the extreme edge and the contiguous line of sprocket holes 10 which border is ordinarily not used for any purpose, a band $b$ is photographed which may be as narrow as that shown in Fig. 1, varying continuously in translucency from one end of the film to the other, said band constituting the sound record from which the sonorous action is to be reproduced by a method and apparatus fully described in my parent case, Serial No. 769,114, filed May 21, 1913, now matured into Patent 1,607,480 dated Nov. 16, 1926, said apparatus being separately claimed in my co-pending application, Serial No. 633,907, filed April 23, 1923.

It may here be noted briefly that the method of reproduction includes the step of subjecting highly restricted portions of the length of the sound record band, successively to a bright light of substantially constant intensity, the residual light passing through the film, impinging upon a light sensitive electric resistance element in a telephone circuit, so that air vibrations are generated, varying from moment to moment with the translucency of the sound record band, to reproduce the original sonorous action, according to which the sound record band on the film was originally prepared.

The sound record band is preferably prepared by sound recording methods and apparatus described in my parent application above referred to, said method being separately claimed in my co-pending divisional case, Serial No. 630,197, filed April 6, 1923, now matured into Patent 1,473,976 dated Nov. 13, 1923, and said apparatus in my co-pending divisional case, Serial No. 637,365 filed May 7, 1923.

The sound record must accurately represent the successive momentary amplitudes of air vibrations by differentiating the areas of density and attenuation corresponding to the shortest length of sound wave recorded upon and to be reproduced from the film, considering that the ordinary moving picture film is moved through the projecting machine at the relatively slow rate of about one foot per second.

This is accomplished by moving the photographic film or other sensitized surface across the back of a screen having, preferably, a fine slit aperture, and by maintaining the sensitized surface in close contact so that only that portion of the sensitized surface exposed by the slit will be acted upon by the light; in other words the area of exposure is at all times limited so as not to exceed the area of the aperture, and hence the minute spaces which are exposed to the light in passing the slit aperture will not again be affected by the variations in light after the exposed part passes the slit, as would be the case if the light sensitive surface were affected by direct rays or diffused light over an area greater than the area of the aperture, thus preventing overlap of the successive variations in density which correspond to the sound waves. This results in a continuous record band of uniform width throughout its length, but of successive connected variations in density, without overlap, and hence more clearly and sharply defined, and corresponding more truly to the variations in light produced by the varying electrical impulses resulting from the sound waves impressed upon the sound recording or transmitting apparatus.

The character of the sound record band will be clear from the greatly enlarged fragmentary view of Fig. 2. Although distinct lines of varying darkness are shown on this enlarged view, it will be understood that the various lines may shade into each other in a continual progression. The darker areas such as shown at $d$—$d$, on the positive film printed from an original negative may represent points of greater attenuation in the air vibration, while the lighter areas 1 represent points of greater density, the degree of translucency corresponding accurately to the density and attenuation of the air vibration at corresponding points. It follows that the distance between successive points of attenuation or of successive points of density corresponds to the fundamental wave length or pitch of the sound, while smaller variations in translucency along the length of a fundamental may represent overtones. Thus the simplest as well as the most complex sound waves are recorded on the film, and can be accurately and realistically reproduced therefrom by the method and apparatus heretofore referred to.

The sound record band, though preferably prepared according to the method and by the apparatus of the co-pending application last referred to, may be prepared by other methods or apparatus. For instance, the band may be synthetically marked either directly in the film or photographed thereon by reduction from a larger band produced synthetically or by any other suitable method.

When my films are provided with but a single phonographic or photophonographic record, as shown, for example in connection with the type of picture represented in Fig. 3, such sound record need not necessarily be one produced by the voice, nor one directly related to the characters portrayed. It may, instead, consist of some instrumental or orchestral selection appropriate to the act or scene represented by the pictures. In this and other pantomime representations, the appropriate musical selection is a matter of choice and would be merely incidental and serve to add to the effectiveness of the subject exhibited, without necessarily being in synchronism therewith.

Although the embodiment of Fig. 1 may be formed with a single sound record, for instance, on the left side of the film, I have here shown sound record bands $b$ and $b'$ near opposite edges of the film. These sound records are preferably different in character, each, however, correlated with the picture, and for certain types of films, the sound records may also be correlated with each other for reproduction of either sound record alone or with the picture or for reproduction of both sound records conjointly with or without the picture.

One desirable application is to multiple language records, particularly suitable in illustrated lecture films for scientific, industrial or technical purposes. In such film, the sound record at the left might represent the verbal or oral explanation of the picture, for instance, in the English language and the band at the right in the French language, so that by selecting the appropriate sound record band for reproduction, the same talking picture film may be used for an English or a French audience. Of course, the film may be provided with additional sound record bands for speaking in still other languages.

While in multiple language records some one of a plurality of sound record bands is selected for reproduction, there are other types of multiple sound record films suitable for reproduction of two or more of the sound record bands concurrently. For instance, in the film shown in Fig. 1, one of the sound record bands $b$ may represent a musical accompaniment while the other band $b'$ may be the record of a vocal accompaniment, said musical and vocal accompaniment being both appropriately synchronized both with the picture and with each other. A film of this type would be projected by a method and with the use of apparatus by which either of the sound record bands alone could be played without the other, or both could be played conjointly. The method of preparing the plurality of correlated sound record bands and of reproducing them, need not be set forth here as it is fully described in the copending applications above referred to.

In the alternative embodiment of Fig. 3, the sound record indicated by letter *b* extends lengthwise of the film at one side of the pictures *p*, a special space 12 being reserved for the sound record between the right hand sprocket perforations 13 on that side of the film and the edge portions of the series of pictures *p* nearest thereto.

Fig. 4 shows an extra wide film, such as I prefer to use in taking and reproducing dramatic or operatic performances, on a large scale, in which the entire stage, either with or without its proscenium arch as a frame for the setting, may be shown as at *p*. This film also has an extra wide space 14 for my sound record *b*, in order to give it ample capacity for the reception and proper reproduction of the powerful sound vibrations of a large chorus and orchestra.

In Fig. 5 the pictures *p* are shown as running horizontally, the height of the picture transversely of the film, and the sound record *b* as extending lengthwise of the film below the picture strip. The purpose of this arrangement is to eliminate, or at least in a large degree to minimize, the objectionable flickering of the ordinary film and the reduction of illumination caused by the use of a shutter, without hampering the recording or reproduction of the sound record.

As the sound record bands may be extremely narrow as shown in Figure 1, a film of usual width may have a multiplicity of record bands arranged side by side the entire length of the film if desired, and entirely independent of motion pictures. Such sound record films without pictures may be reproduced either directly from the developed negative film, or from positive copies of the same. One film would thus serve for a considerable number of separate and distinct vocal or musical selections, to be reproduced selectively.

In the case of a film fed from one reel to another, each alternate sound record band may be impressed in a direction opposite to the next adjacent band, so that the film may be reproduced both while traveling in a forward and in a backward direction, eliminating the special step of rewinding usual in moving picture projetcion.

The film of the general type last described may, if desired, be formed as an endless band, in which case the sound record or succession of sound records would preferably be formed thereon as a continuous elongated helix of very low pitch. The film supporting rolls of the reproducing apparatus for such record would be given a small lateral feed motion, so that successive lengths of the helix would, in projection or reproduction, be subjected seriatim to the reproducing light beam. A single selection of relatively enormous length can thus be reproduced from a single relatively small or narrow film.

I claim:

1. A kinematographic film of substantially standard width having two lines of sprocket holes near the edges thereof spaced apart by a standard distance and having standard width picture frames in series lengthwise of the film, representing successive stages of a visual action; the combination therewith of a pair of independent sound record bands on the film laterally of the picture frames and extending lengthwise on the film, said sound records being each correlated with the visual action, the translucency of said sound record bands varying continuously lengthwise of the film substantially proportionally to the momentary amplitude of air vibrations accompanying the corresponding original sonorous action.

2. A kinematographic film of substantially standard width having two lines of sprocket holes near the edges thereof spaced apart by a standard distance and having standard width picture frames in series lengthwise of the film representing successive stages of a visual action; the combination therewith of a pair of independent sound record bands on the film laterally of the picture frames and extending longitudinally on the film near opposite edges thereof, said sound records being each correlated with the visual action, the translucency of said sound record bands varying continuously lengthwise of the film substantially proportionally to the momentary amplitudes of air vibrations accompanying the corresponding sonorous action.

3. A combined motion picture and photographic sound record, either in the form of a photographic negative or a positive print made from such a negative, characterized by a series of pictures of successive positions of an object in motion, and a plurality of sound record lines of uniform width throughout their length extending parallel to the line of pictures, and having lengthwise variations in density or translucency representing sound waves, and further characterized by said variations or waves being composed of successive, connected, sharply defined and definitely limited areas appearing as lines or stripes extending across the record line.

4. A combined motion picture and photographic sound record, either in the form of a photographic negative or a positive print made from such a negative, characterized by a series of pictures of successive positions of an object in motion, and a plurality of independent sound record lines of uniform width throughout their length extending parallel to and on opposite sides of the line of pictures, and having lengthwise variations in density or translucency joined together in a continuous line representing sound waves, and further characterized by said variations or waves being composed of successive sharply defined and definitely limited areas appearing as lines or stripes extending across the record lines.

Signed at New York city, in the county of New York and State of New York, this 18th day of April, 1923.

ELIAS E. RIES.